(12) United States Patent
Winckles et al.

(10) Patent No.: US 6,829,221 B1
(45) Date of Patent: Dec. 7, 2004

(54) BORDER GATEWAY PROTOCOL MANAGER AND METHOD OF MANAGING THE SELECTION OF COMMUNICATION LINKS

(75) Inventors: Adrian M Winckles, Cambs (GB); Julian Frank Cable, Herts (GB); Catherine Rosenberg, West Lafayette, IN (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/472,447

(22) Filed: Dec. 27, 1999

(51) Int. Cl.[7] .................................................. H04J 1/16
(52) U.S. Cl. ........................ 370/238; 370/248; 370/252
(58) Field of Search ................................ 370/229, 238, 370/248, 252, 254, 255, 315, 316, 351, 400, 401, 410, 522, 230, 237, 235, 236; 709/230, 238

(56) References Cited

U.S. PATENT DOCUMENTS

| | | | | |
|---|---|---|---|---|
| 5,594,780 A | * | 1/1997 | Wiedeman et al. | ......... 455/430 |
| 5,974,315 A | * | 10/1999 | Hudson | ........................ 455/427 |
| 6,167,444 A | * | 12/2000 | Boden et al. | ................ 709/223 |
| 6,233,456 B1 | * | 5/2001 | Schiff et al. | ................. 455/439 |
| 6,392,997 B1 | * | 5/2002 | Chen | .......................... 370/252 |
| 6,538,416 B1 | * | 3/2003 | Hahne et al. | ................ 370/431 |
| 6,604,146 B1 | * | 8/2003 | Rempe et al. | .............. 709/238 |

* cited by examiner

Primary Examiner—Frank Duong
Assistant Examiner—Melanie Jagannathan
(74) Attorney, Agent, or Firm—Barnes & Thornburg LLP

(57) ABSTRACT

A border gateway protocol (BGP) management system (10) dynamically determines an optimum or preferred data route (12) from wireline networks (18) into a satellite communication system (11). Multiple gateways (16, 30–34) provide access points to the wireline networks. The management system includes a connectivity matrix which processes (74) information, such as bandwidth availability and route congestion, and then generate a BGP update that is communicated (80) into at least one of the gateways. The BGP update promotes preferred gateways and so identifies a preferred access path to the satellite system. Specifically, the BGP update instruction contains a metric altering a weighting of an identified route data route, which metric effects path selection at a gateway receiving IP datagrams. The metric is derived from information pertaining to a connectivity matrix associated with the satellite system.

34 Claims, 4 Drawing Sheets

BORDER GATEWAY PROTOCOL MANAGER AND METHOD OF MANAGING THE SELECTION OF COMMUNICATION LINKS

BACKGROUND TO THE INVENTION

The invention relates, in general, to a system and method for dynamically managing the transport of internet protocol-based traffic between user terminals and external 'gateways', and is particularly, but not exclusively, applicable in the context of a satellite system having a multiplicity of user beams accessible from several gateways of an internet-type terrestrial domain.

SUMMARY OF THE PRIOR ART

In modern telecommunication systems, information (such as coded speech and data) may be transferred using a variety of techniques across a plethora of system architectures, including satellite links, internet domains and broadband networks. With demand for constantly increasing levels of service, communication technologies are embracing integration of systems to provide enhanced architectures that synergistically benefit from efficient use of transport mechanisms during successive environments. However, the interworking of differing communication technologies often leads to implementation problems, particularly associated with the inability of different systems to realy, in a contiguous and seamless fashion, control information in a usable form. There are clearly mechanisms that allow for direct translation, or the re-packaging of information, but with integration of certain communication architectures and protocols in there embryonic stages the issues of providing full interworking are yet to be fully appreciated or addressed.

In multimedia broadband satellite systems, there is a necessity to transport traffic between user terminals and external gateways. There gateways are essentially router-based interfaces to either an internet service provider (ISP) via the internet or a private network (such as a local area network, LAN) supporting, for example, internet protocol (IP) traffic. As regards interfacing between external terrestrial networks and a satellite network running IP-based protocols (both over the ground and in satellite sagments thereof), such interfacing requires the exchange of interior and exterior routing information. Traditionally, large scale networks, like the Internet or other private carrier network, have to date used specifically developed routing protocols, such as the border gateway protocol (BGP4) discussed in the outline article "A Border Gateway Protocol (BGP)" by K Lougheed et al, June 1989 (available at http://sunsite.org.uk/rfc/rfc1105.txt). Indeed, BGP provides an interworking capability between the internet and a satellite gateway.

As will be appreciated, each gateway therefore provides an ingress/egress point for a satellite link, thus providing the interface to terrestrial networks, whereas each terminal connects user (e.g. computer) equipment to the satellite link in a dial-on-demand fashion (i.e. connectivity when requested). Gateways may be interconnected. As regards a typical geo-stationary satellite, terminally circular geographic coverage area (or 'footprint') in which designated service are provided.

Recent progress in swithching capabilities of satellite systems has enabled mappings between user beams (UBs) to gateways to follow a one-to-many basis (as well as the original one-to-one basis). In other words, connections to multiple gateways from the same user beam and multiple user beams from one gateway are now readily supportable, although there is usually some form of default set-up where a particular user beam is always associated with a particular gateway. The mapping of such user beam to gateway connection information (known as the "connectivity matrix") is held by a network controller that operationally managers connections through the system. However, the satellite payload does not utilise any information concerning bandwidth availability or congested data routes and so it is not possible to determine the optimum (or "least cast" through the satellite network in terms of the route set-up overhead) data route. Furthermore, connectivity requirements within a satellite system are often in a state of flux (changing from hour to hour), as a consequence of changing service demands, fault conditions and system operator decisions.

Decision between separate ISPs (or network providers) to use policy-based routing to enforce routing decisions based on the use or avoidance of selected inter-autonomous system (ASs) as transit networks, is known as a "peering agreement". Moreover, in order to achieve a situation where ingress bound IP packets can have an optimum route it is necessary to have peering agreements with internet service providers (ISPs). Such agreements are provided by BGP policy-based routing techniques (discussed in more detail below). The use of policy-based routing is understood to help avoid congestion within a satellite network as the policy-based routing distributes points of ingress of IP packets across a large number of gateways, rather than just restricting access to a single or small number of gateways.

In modern satellite networks, difficulties are often experienced as a result of 'internet bottlenecks' caused, for example, by: i) congested routers providing access between multiple inter-autonomous systems; ii) the set-up of links that attempt to avoid long haul terrestrial routes. Consequently, there is a need to identify and utilise data paths that bypass such difficulties, but which are preferably optimised in terms of shortest route length. The latter criterion is important when one considers that if an IP data packet has a longer route to traverse, then there is both an increased chance of the IP packet being lost and second, that an unacceptably long delay may be introduced into the path. Of course, in view of the distances travelled by signals in a satellite system, some delay is unavoidable (but excessive delays render services, such as voice calls unacceptably fractured and hence incoherent). It will be understood that, in this particular context, route length may be determined by the number of hops or routes that process the packet, as well as absolute traversed distance.

In a multimedia broadband satellite system, it is known to have an element of on-board processing within a satellite payload. Such satellite systems generally have dynamically changing connectivity. This information is vital in determining both how network topology is represented at any one moment in time and also the correct "link state" for the connection. However, upon transgressing a boundary between the satellite system and the terrestrial network, dynamically changing traffic loading within the satellite system is not effectively relayed into the terrestrial network using BGP, with the border gateway (routing) protocol only providing policy management routing without any indication of optimised route selection.

BGP is an inter-autonomous system routing protocol that requires considerable manual intervention in order that its policy-based routing decisions work correctly. Often, manual changes are required to rectify incorrect policy decisions. Thus, BGP is reliant upon manual updates to maintain its correct function and, clearly, it is not dynamically interactive to other network changes. Even thought some vendor platforms have sufficient intelligence to handle some forms of automatic distribution of configuration information, BGP is still an exception to the rule and is, in fact, reliant on manual configuration to notify and update the distribution of internal routes (within an IP-based network) in order to advise external systems elements. Manual configuration is inefficient in terms of both time and expense). In operation, BGP essentially only propagates a gateway address through the interconnected network that indicates one of a number of paths to a satellite user beam. BGP is, in fact, unable to differentiate between different routes/paths and so in unable to advise, select or otherwise route a packet of data (or the like) through a link having, say, the largest bandwidth, shortest distance, link quality, the level of congestion at a gateway, efficiency, etc. In other words, BGP advertises user beam availability to internet service providers coupled through a terrestrial network to a gateway.

There are additional issues that need to be addressed for complete interworking of a satellite system with a terrestrial network. For example, in satellite networks, there is a high occurrence of "user" connectivity available upon request. In this respect, connectivity can be considered to include dial-on-demand, with users paying for bandwidth as they use it and conceptually no permanent connections. For this reason, routes to individual subnets are only available when a user is (or a group of users are) actually connected even though such subnets are advertised by BGP as being available. In other words, present use of BGP can inaccurately reflect the connectivity within the satellite system.

Beam availability is another important factor that needs to be considered when using BGP to advertise internal satellite routes/links to external networks. Specifically, if there are no active connections within a user beam or if for some reason the gateway is inoperative, e.g. as a consequence of malfunction or interconnected wireline severance, than the routes available through that particular user beam should not be advertised as being available. However, the presently unresponsive nature of BGP inaccurately maintains an indication of route availability until manual alteration of BGP occurs; this clearly causes connection problems within the system as a whole and may result in lost calls and loss of revenue for the service operator.

As will therefore be appreciated, ideally, changes in availability with the satellite-terrestrial communication system should be advertised within the terrestrial network in a prompt, if not immediate, fashion. Moreover, the advertising of such routes should indicate whether a user beam or subscriber equipment is available (or not, as the case may be).

For completeness, it will be understood that, in operation, BGP uses a messaging protocol such as transmission control protocol/internet protocol (TCP/IP). Such a transmission protocol requires that two hosts form a transport protocol connection between one another and exchange messages to open and confirm the connection parameters. The initial data flow forms the entire BGP routing table, with incremental updates sent as the routing table changes. Furthermore, notification messages are sent in response to errors or special condition concerning the connection. If a connection encounters an error condition, a notification message is sent and the connection is optionally closed.

SUMMARY OF THE INVENTION

According to a first aspect of the present invention there is provided a method of routing information within a communication system having a wireline network interconnected through a plurality of gateways to a satellite system, the communication system having a network controller arranged to promote a route to the satellite system via a preferred gateway, the method comprising: generating BGP update instruction at the network controller, the BGP update instruction containing a metric altering a weighting of an identified route; sending the BGP update instruction to at least one of the plurality of gateways; and propagating the BGP update instruction into the wireline network from the at least one of the plurality of gateways.

Preferably, the metric is derived from a status of at least one gateway.

The metric may be determined from at least one of processing bandwidth; path availability information; and route congestion information.

In a preferred embodiment, the metric is associated with path attributes within the BGP update instruction.

The metric may be generated in response to receipt of a status report from at least one of the plurality of gateways. Furthermore, the status report may be generated in response to interrogation of said at least one of the plurality of gateways by the network controller.

It is preferred that the connectivity matrix is updated by the BGP update instruction.

In a particular embodiment, the plurality of gateways include a memory, and the method further comprises: updating the memory upon receipt of the BGP update instruction, the BGP update instruction providing a preferred route to the satellite system. Preferably, the BGP update instruction identifies an optimum route to the satellite system.

In a second aspect of the present invention there is provided a method of routine information within a satellite system having a connectivity matrix arranged to promote a data path via a preferred gateway providing a terrestrial interface to the satellite system, the method comprising: generating a border gateway protocol (BGP) update instruction from the connectivity matrix; and sending the BGP update instruction to terrestrial gateways to alter path selection undertaken thereby.

In this aspect, the method may further comprise generating a metric within the BGP update instruction altering a weighting of an identified route.

In a further aspect of the present invention there is provided a border gateway protocol (BGP) manager for control of routes through gateways between a terrestrial wireline network and a satellite system, the BGP manager comprising: means for generating a BGP update instruction containing a metric altering a weighting of an identified route; and means for sending the BGP update instruction to at least one gateway, thereby to promote to the terrestrial wireline network a route to the satellite system via a preferred gateway.

The BGP manager may further comprise: a connectivity matrix; and wherein the connectivity matrix is updated by the BGP update.

In another aspect of the present invention there is provided a network element of a wireline network coupled, in use, to a satellite communication system, the gateway comprising: a controller and associated memory co-operating to store communication paths to the satellite system, the controller responsive to BGP update instruction containing a metric altering a weighting of an identified route; and means for selecting a route into the satellite system in response to the BGP update.

The network element is typically one of a gateway and a router, and generally further comprises means for propagating the BGP update instruction into the wireline network.

Preferably, the network element has: means for determining an operational status of the network element; and means for communicating the status to a network controller to affect the metric.

In yet another aspect of the present invention there is provided a computer program product for a border gateway protocol management system having a network controller administering routing between a wireline network interfaced to a satellite communication system through a plurality of gateways, the computer program product comprising: code that directs the network controller to generate a BGP update instruction containing a metric altering a weighting of an identified route; code that directs the network controller to send the BGP update instruction to at least one of the plurality of gateways, whereby the network controller promotes a route to the satellite system via a preferred gateway; wherein the codes reside in a computer readable medium.

Advantageously, the present invention provides a system that enables a satellite network to maintain connectivity and utilise a least cost data route despite a slowly changing satellite connectivity matrix. Thus, optimum IP routing information for a satellite network may be provided for ingress bound packets to be delivered to the most appropriate gateway. Indeed, the present invention can be operated in a dynamic fashion in order to address bottlenecks that could potentially arise form identified paths, via preferred gateways, for particular user beams.

A border gateway protocol (BGP) management system dynamically determines an optimum or preferred data route from wireline networks into a satellite communication system. Multiple gateways provide access points to the wireline networks. The management system includes a connectivity matrix which processes information, such as bandwidth availability and route congestion, and then generate a BGP update that is communicated into at least one of the gateways. The BGP update promotes preferred gateways and so identifies a preferred access path to the satellite system. Specifically, the BGP update instruction contains a metric altering a weighting of an identified route data route, which metric effects path selection at a gateway receiving IP datagrams. The metric is derived from information pertaining to a connectivity matrix associated with the satellite system.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
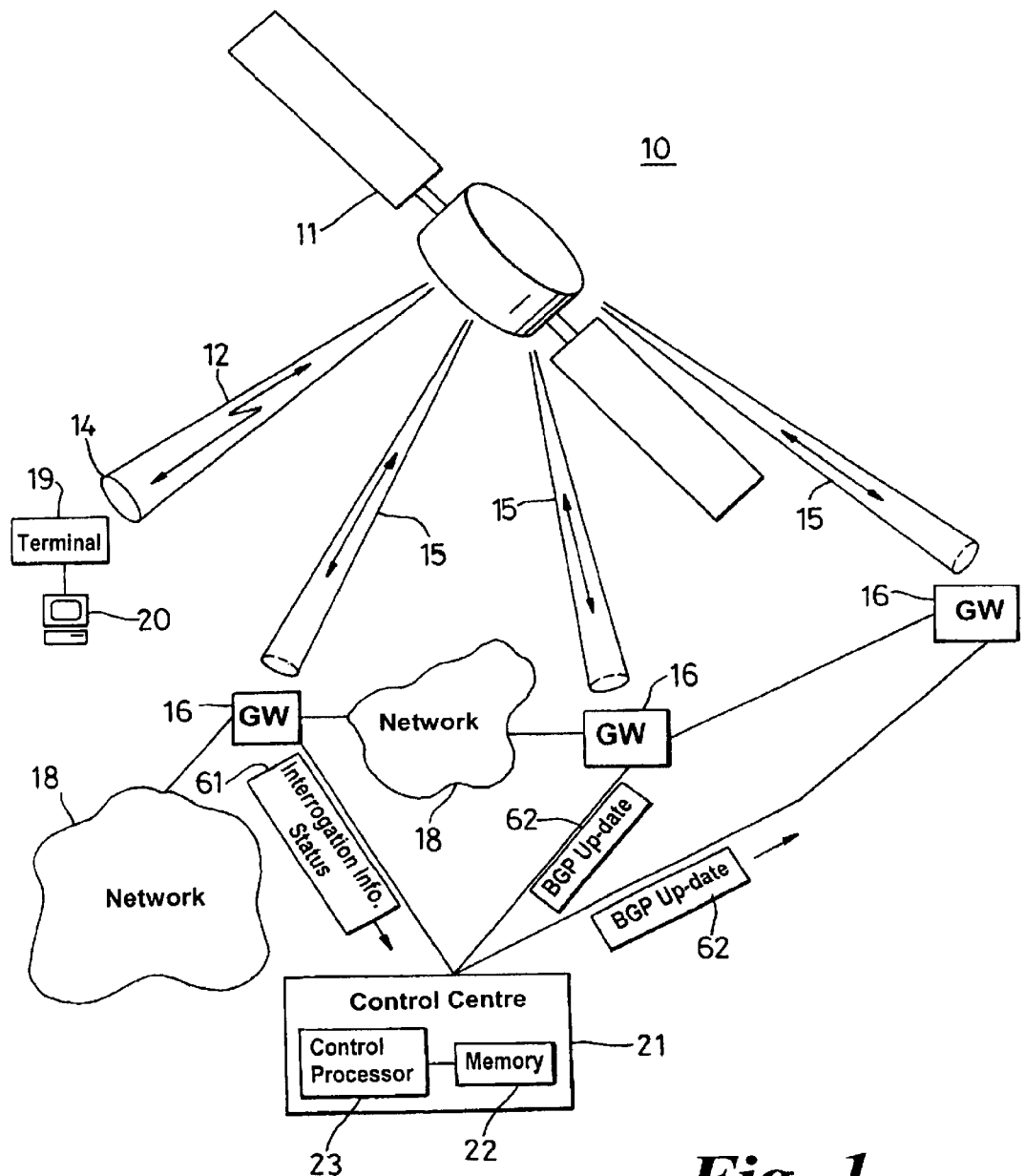
FIG. 1 is a block diagram of a satellite communication system showing user beams and gateways.

FIG. 1 illustrates a satellite-terrestrial communication system 10 adapted to support the concepts of the various embodiments of the present invention. A satellite network 11 has several bi-directional user beams 12 (of which only one is shown) each providing an area of coverage 14. Since the satellites of the preferred embodiment are in geo-stationary orbit, the coverage areas are geographically fixed. Bi-directional service conduits (i.e. gateway beams) 15 provide communication paths to a gateway 16. Multiple gateways could be provided by each service conduit if desired. Each gateway provides an access point to the terrestrial network 18 (of which there could be many within the system 10), with each terminal 19 providing satellite accessibility to data devices 20, such as computers. In a preferred embodiment, the terminals 19 may be IP passive edge routers. In a preferred embodiment, the terminals 19 may be IP passive edge routers. Each terminal 19 is therefore part of the IP subnet with a dedicated IP address. In operation, therefore, any terminal can be addressed by selection of its IP address from a range of IP addresses uniquely assigned to each user beam.

The terrestrial networks 18 may support various communication protocols and so may take the form, the example, of ISDNs or ATM networks or IP networks. The various networks may be interconnected via several gateways.

Each gateway 16 is connected to a control centre 21 that stores (in memory 22) and utilises connection criteria relevant to the various terrestrial and satellite links. In other words, the connectivity matrix is held in the control centre 21, with the connectivity matrix accessible from a control processor 23 to administer route selectivity. The connectivity matrix typically includes various communication link related parameters, including bandwidth, availability, loading and changing connectivity profiles.

Figure 2:
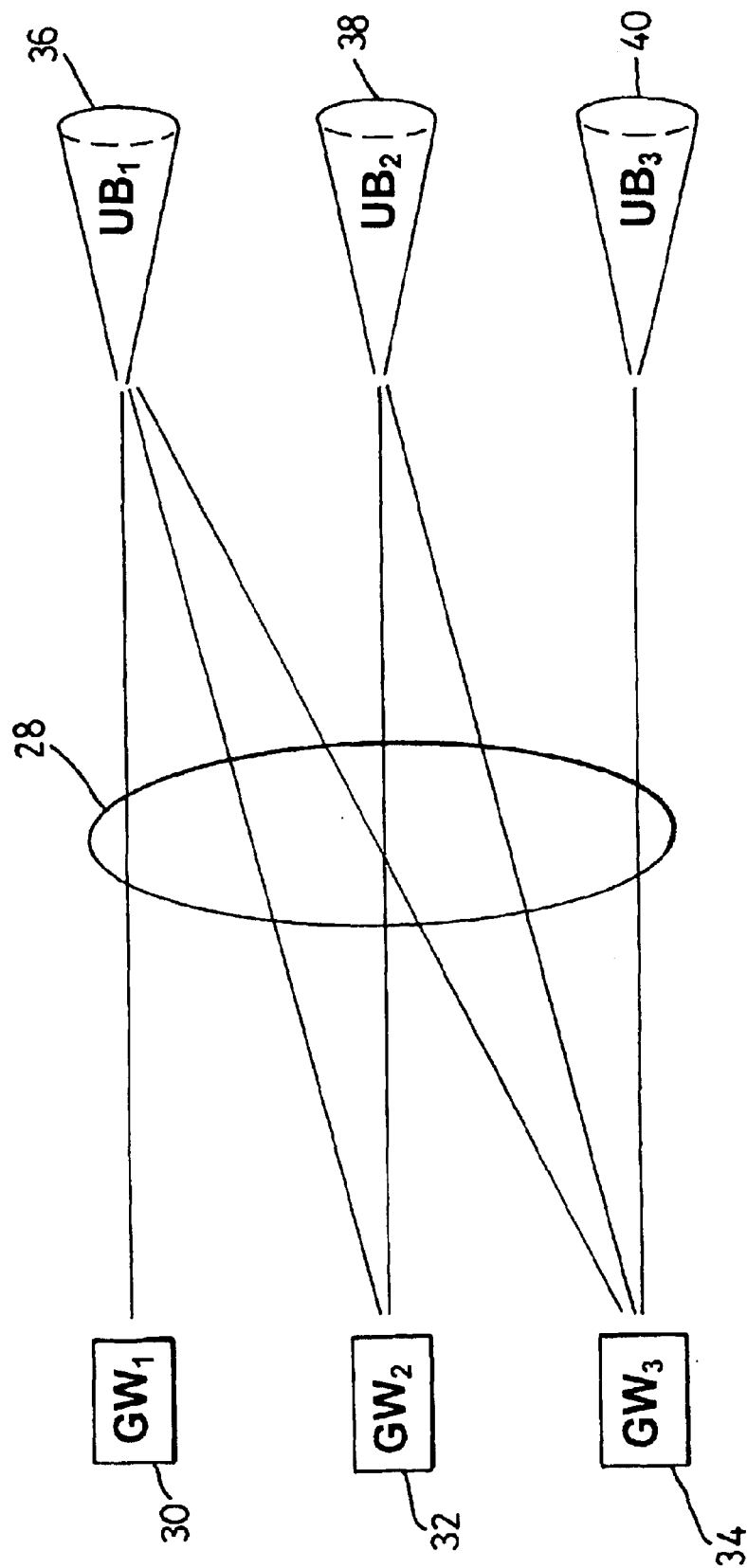
FIG. 2 is a block diagram to illustrate mapping possibilities between gateways and user beams.

FIG. 2 illustrates mapping possibilities between gateways and user beams. Connections 28, as previously indicated, may be on a one-to-one, many-to-one and many-to-many mapping basis from either gateways (GW) 30–34 or user beams 36–40.

Figure 3:
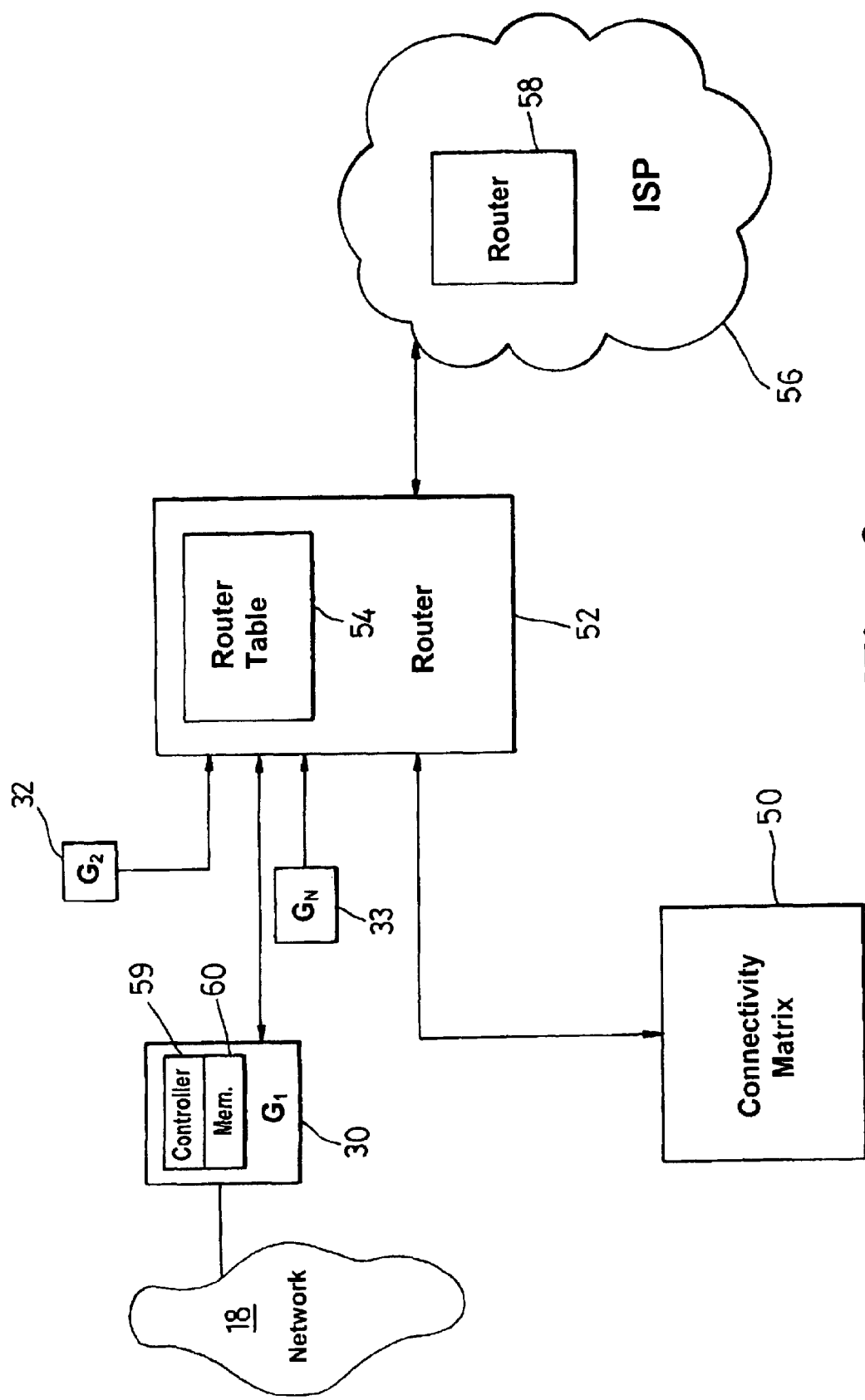
FIG. 3 shows a system configuration supporting a BGP management architecture according to a preferred embodiment of the present invention.

FIG. 3 shows a system configuration supporting a BGP management architecture according to a preferred embodiment of the present invention. A connectivity matrix 50, held in the memory of network control centre (of FIG. 1), is coupled to a router 52 having an associated router table 54 providing routing information. The router is coupled to an internet service provider 56 also containing a router function 58. Each gateway, e.g. gateway $G_1$ (reference numeral 30), contains a controller 59 and associated memory 60 co-operating to provide routing functionality. The controller 59 can also act in a management capacity, and can therefore interpret and report on local management status, such as pertaining to virtual circuits, paths, available bandwidth, instantaneous gateway loading, fault detection and correction (to name but a few). Each gateway is therefore able to provide status reports (reference numeral 61 of FIG. 1) to the network control centre, which status reports can be independently submitted by the gateway or be responsive to interrogation or polling from the network control centre. Additionally, the controller 59 can function to update its local memory with system configuration and/or topology information, such as preferred routing paths to particular gateways.

The preferred embodiment of the present invention utilises the system architecture of FIG. 3 to send BGP updates messages (reference numeral 62 of FIG. 1) to the various gateways which then propagate the BGP updates into the interconnected networks (18 of FIG. 1). More particularly, the network control centre determines connectivity parameters (such as instantaneous loading, bandwidth, etc.) for the various gateways into the satellite system and then generates the BGP update 62 to promote advertisement of particular gateways offering the best defined connectivity parameters. Of course, the network control centre could also react to system operator instructions concerning routing by issuing a BGP update 62 having metrics that appropriately adjust path attributes. The generation of the BGP update 62 therefore influences ingress traffic into the gateway from the terrestrial network, with the generation of the BGP update further causing associated up-date in the connectivity matrix 50.

As regards the specific nature of the BGP update 62, the system of the preferred embodiment of the present invention assigns a metric to path attributes to define a preferred route. Therefore, by changing, within time, the metrics associated with path attributes the network control centre can steer IP datagrams (and hence calls) to particular selected gateways depending upon instantaneous or historic loading, throughput or accessibility of each particular gateway. Generally, therefore, the network control centre optimises system operation to advertise least cost routes to the satellite network for the set-up of communication paths through the system as a whole. The network control centre therefore instructs each gateway to propagate automatically a BGP update 62 into the internet service providers (ISPs) or the like to advertise preferred paths, which ISPs react by looking to the metrics associated with predetermined path attributes to identify these preferred paths. This contrasts with the prior art mechanism that requires manual update of BGP and wherein the ISP uses an arbitrary scheme to decide to which gateway IP traffic should be routed. BGP updates may also be exported to the ancillary networks, such as a LAN supported from the internet. The network control centre is therefore able to address and react immediately to connectivity changes affecting gateways. Indeed, the BGP manager may deny routing via certain routes that are congested or otherwise unavailable.

The BGP update 62 causes the controller in the gateway to update local memory used to store path information, with the gateway propagating the BGP update 62 onward and into the network towards its peer (or next hop) routers in subsequent downstream transmissions, e.g. during the next TCP connection. Advertisement of the connectivity change therefore ripples through the ISPs or networks.

Various path attributes may be changed to indicate preferred paths in accordance with the preferred embodiment of the present invention. For example, such path attributes include: i) the multiple exit discrimination attribute; ii) AS path segment; iii) peer IP address; iv) best route attribute; and others known to the skilled addressee. A preferred embodiment makes use of the multiple exit discrimination attribute.

In terms of general structure of the BGP update, this will take the exemplary form of:

NLRI.Next Hop($GW_n$) IP address.path attribute blocks.AS path ($AS_x, AS_y$ ... )

The AS path indicates the intermediate networks through which the packet should pass through, whilst the NRLI (Network Layer Reachability Information) can be considered as pertaining to a supernet of contiguous IP address ranges. The path attribute blocks include by mandatory and discretionary (and associated date) that is byte-specific.

It will be appreciated that egress traffic from the gateway into the terrestrial network can flow independent of gateway configuration in the ingress (satellite uplink) direction.

Figure 4:
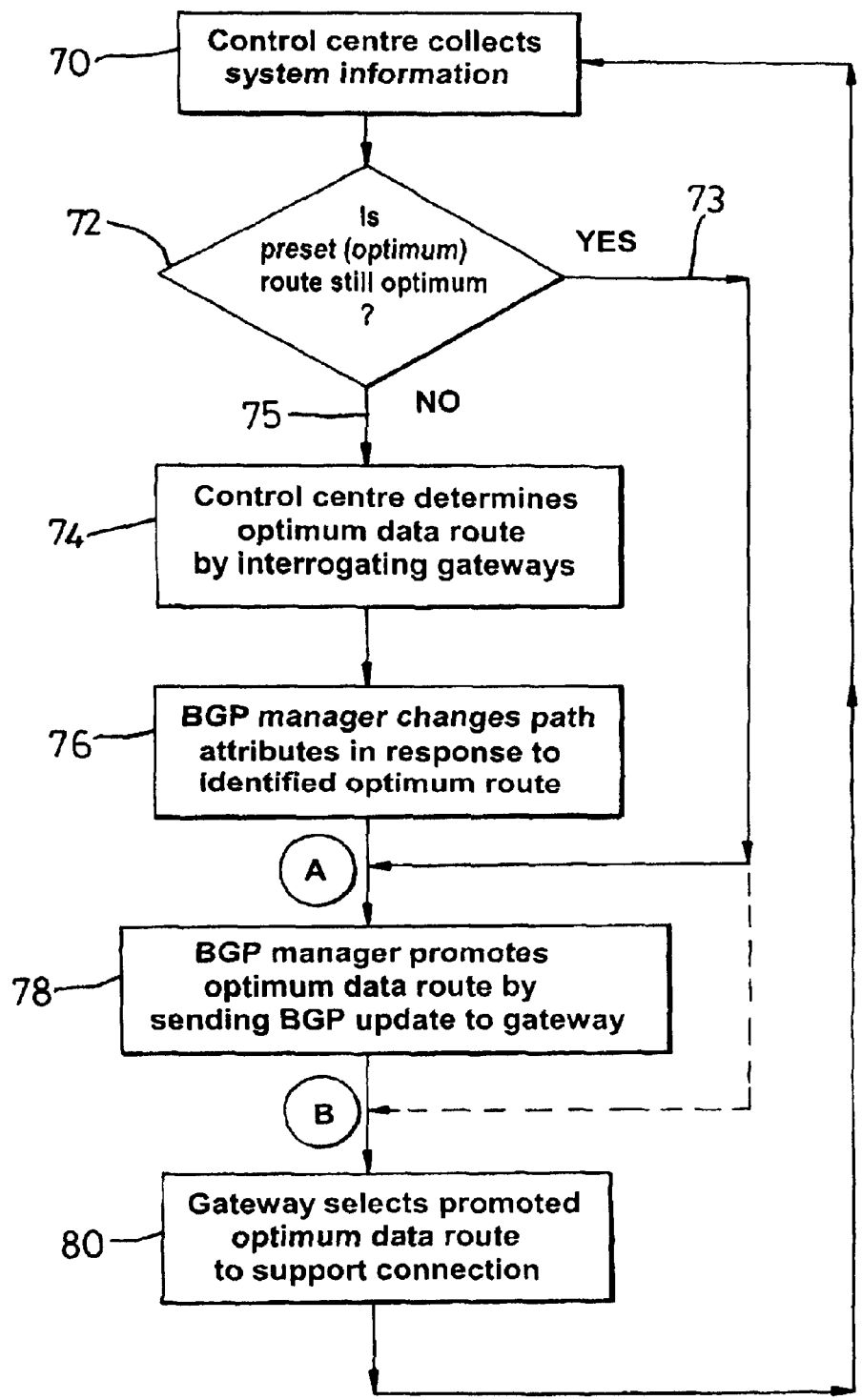
FIG. 4 is a flow diagram illustrating a preferred operating methodology of a border gateway protocol manager according to the present invention.

FIG. 4 illustrates a preferred operating method of the present invention which begins at block 70 where the control centre (or connectivity matrix) collects information on criteria 70 such as bandwidth availability and route congestion. The control centre then determines 72 whether the present data route is still the optimum route. If the present route is the optimum route 73, then either a) the BGP manager promotes the optimum data route by sending 78 a BGP update to the gateway (if such updates are sent continuously); or, b) the gateway can select 80 the promoted optimum data route to support the connection (if the updates are sent once and them stored in the gateway).

However, if the present data route is no longer the optimum route (path 75 from step 72) then it is necessary for the control centre to determine 74 the current optimum data route by monitoring the status of interconnected gateways. The BGP manager then changes 76 the path attributes in response to the newly identified current optimum data route and this route is then promoted by sending 78 a BGP update to the gateway. The gateway is then able to select 80, the promoted optimum data route to support the data connection.

In summary, the BGP management architecture interprets routing information at each gateway 30–34 that is specific to the connectivity available within the satellite network at that point and then causes generation of an advertisement that can propagate into terrestrial networks to define preferred gateways for specific user beam access. The connectivity matrix 50, BGP management policies and the addressing information are preferably obtained from a central management point (e.g. the network control centre 21) and dynamic updates are sent whenever a change occurs.

Implementation of the BGP management system is principally software based, although interactive interrogation of the gateways requires collocated management logic.

In a software driven environment, additional gateway and network control centre functionality could be provided in the form of a CD-ROM (or the like), although it is also conceivable that wireline transfer could be employed to update existing network components, such as gateways and routers.

It will be appreciated that the above description has given by way of example only and that modifications in detail may be made within the scope of the invention. Since BGP provides a multi-protocol communication tool that operates independently and seamlessly across multiple ISPs or networks, the re-configuration information sent in the preferred embodiment uses BGP as its protocol/carrier base. Of course, should other multi-dimensional border gateway protocols be developed then clearly substitution could occur.

What is claimed is:

1. A method of routing information within a communication system having a wireline network interconnected through a plurality of gateways to a satellite system, the communication system having a network controller arranged to promote a route to the satellite system via a preferred gateway, the method comprising:

generating a BGP update instruction at the network controller, the BGP update instruction containing a metric altering a weighting of an identified route, said metric being derived from information pertaining to a connectivity matrix associated with the satellite system;

sending the BGP update instruction to at least one of the plurality of gateways; and propagating the BGP update instruction into the wireline network from the at least one of the plurality of gateways.

2. The method as claimed in claim 1, wherein the metric is derived from a status of at least one gateway.

3. The method as claimed in claim 1, wherein the metric is determined from at least one of:
processing bandwidth;
path availability information; and
route congestion information.

4. The method as claimed in claim 1, wherein the metric is associated with path attributes within the BGP update instruction.

5. The method as claimed in claim 1, wherein the metric is generated in response to receipt of a status report from at least one of the plurality of gateways.

6. The method as claimed in claim 5, wherein the status report is generated in response to interrogation of said at least one of the plurality of gateways by the network controller.

7. The method as claimed in claim 1, wherein the connectivity matrix is updated by the BGP update instruction.

8. The method as claimed in claim 1, wherein the plurality of gateways include a memory, and the method further comprises:
updating the memory upon receipt of the BGP update instruction, the BGP update instruction providing a preferred route to the satellite system.

9. The method as claimed in claim 8, wherein the BGP update instruction identifies an optimum route to the satellite system.

10. A method of routing information within a satellite system having a connectivity matrix arranged to promote a data path via a preferred gateway providing a terrestrial interface to the satellite system, the method comprising:
generating a border gateway protocol (BGP) update instruction from the connectivity matrix, said BGP update instruction providing a data path offering the best defined connectivity parameters; and
sending the BGP update instruction to terrestrial gateways to alter path selection undertaken thereby.

11. The method of routing according to claim 10, further comprising:
generating a metric within the BGP update instruction altering a weighting of an identified route.

12. The method of routing according to claim 11, wherein the metric is derived from a status of at least one gateway.

13. The method of routing according to claim 11, wherein the metric is determined from at least one of:
processing bandwidth;
path availability information; and
route congestion information.

14. The method of routing according to claim 11, wherein the metric is associated with path attributes within the BGP update instruction.

15. The method of routing according to claim 11, wherein the metric is generated in response to receipt of a status report from at least one of the plurality of gateways.

16. The method as claimed in claim 15, wherein the status report is generated in response to interrogation of said at least one of the plurality of gateways by the network controller.

17. The method of routing according to claim 10, wherein the connectivity matrix is updated by the BGP update instruction.

18. The method of routing according to claim 10, further comprising a plurality of gateways each having associated memory, the method further comprising:
updating the memory upon receipt of the BGP update instruction, the BGP update instruction providing a preferred route to the satellite system.

19. The method of routing according to claim 18, wherein the BGP update instruction identifies an optimum route to the satellite system.

20. A border gateway protocol (BGP) manager for control of routes through gateways between a terrestrial wireline network and a satellite system, the BGP manager comprising:
means for generating a BGP update instruction containing a metric altering a weighting of an identified route, said metric being derived from information pertaining to a connectivity matrix associated with the satellite system; and
means for sending the BGP update instruction to at least one gateway, thereby to promote to the terrestrial wireline network a route to the satellite system via a preferred gateway.

21. The BGP manager according to claim 20, further comprising:
a connectivity matrix; and
wherein the connectivity matrix is updated by the BGP update.

22. The BGP manager according to claim 20, wherein the metric is derived from a status of at least one gateway.

23. The BGP manager according to claim 20, wherein the metric is determined from at least one of:
processing bandwidth;
path availability information; and
route congestion information.

24. The BGP manager according to claim 20, wherein the metric is associated with path attributes within the BGP update instruction.

25. The BGP manager according to claim 20, further comprising means for interrogating said gateways to determine an operational status thereof.

26. The BGP manager according to claim 20, wherein the connectivity matrix is updated by the BGP update instruction.

27. The BGP manager according to claim 20, wherein the BGP update instruction identifies an optimum route to the satellite system.

28. A network element of a wireline network coupled, in use, to a satellite communication system, the gateway comprising:
a controller and associated memory cooperating to store communication paths to the satellite system, the controller responsive to BGP update instruction containing a metric altering a weighting of an identified route; and
means for selecting a route into the satellite system in response to the BGP update.

29. The network element of claim 28, further comprising means for propagating the BGP update instruction into the wireline network.

30. The network element of claim 28, wherein the network element is one of a gateway and a router.

31. The network element of claim 30, further comprising:
means for determining an operational status of the network element; and
means for communicating the status to a network controller to affect the metric.

32. The network element of claim 30, wherein the metric is associated with path attributes within the BGP update instruction.

33. A computer program product for a border gateway protocol management system having a network controller administering routing between a wireline network interfaced to a satellite communication system through a plurality of gateways, the computer program product comprising:

code that directs the network controller to generate a BGP update instruction containing a metric altering a weighting of an identified route, said metric being derived from information pertaining to a connectivity matrix associated with the satellite system;

code that directs the network controller to send the BGP update instruction to at least one of the plurality of gateways, whereby the network controller promotes a route to the satellite system via a preferred gateway;

wherein the codes reside in a computer readable medium.

34. The computer program product of claim 33, further comprising:

code that causes propagation of the BGP update instruction into the wireline network from a recipient gateway.

\* \* \* \* \*